(12) United States Patent
Iwano (10) Patent No.: US 11,383,767 B2
(45) Date of Patent: Jul. 12, 2022

(54) FRONT PILLAR AND MANUFACTURING METHOD THEREFOR

(71) Applicant: TOYOTA JIDOSHA KABUSHIKI KAISHA, Toyota (JP)

(72) Inventor: Yoshihiro Iwano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 96 days.

(21) Appl. No.: 16/527,344

(22) Filed: Jul. 31, 2019

(65) Prior Publication Data

US 2020/0094877 A1 Mar. 26, 2020

(30) Foreign Application Priority Data

Sep. 21, 2018 (JP) .............................. JP2018-177569

(51) Int. Cl.
*B62D 25/04* (2006.01)
*B62D 25/08* (2006.01)

(52) U.S. Cl.
CPC ............. *B62D 25/04* (2013.01); *B62D 25/08* (2013.01)

(58) Field of Classification Search
CPC ...................................................... B62D 25/04
USPC ...................................................... 296/193.06
See application file for complete search history.

(56) References Cited

U.S. PATENT DOCUMENTS

| | | | | |
|---|---|---|---|---|
| 6,340,200 B1* | 1/2002 | Enomoto | ................. | B60R 21/34 296/187.04 |
| 7,344,186 B1* | 3/2008 | Hausler | ................. | B62D 25/04 296/187.05 |
| 10,189,504 B2* | 1/2019 | Terada | ................... | B62D 27/02 |
| 2007/0063546 A1* | 3/2007 | Lassi | ................... | B62D 25/2036 296/193.06 |
| 2007/0193013 A1* | 8/2007 | Mellas | .................. | B21C 37/185 29/557 |
| 2011/0248525 A1* | 10/2011 | Lundstroem | ........... | B62D 25/04 296/191 |
| 2013/0020835 A1* | 1/2013 | Szuba | ................... | B21C 37/155 296/193.06 |
| 2018/0273102 A1* | 9/2018 | Komoriya | ............ | B62D 29/005 |
| 2018/0273103 A1* | 9/2018 | Komoriya | .................. | B60J 1/10 |
| 2018/0273104 A1* | 9/2018 | Ikeda | .................... | B62D 29/005 |
| 2018/0273106 A1* | 9/2018 | Ikeda | ......................... | B60J 1/02 |
| 2019/0039553 A1* | 2/2019 | Komura | ................ | B22D 11/06 |

(Continued)

FOREIGN PATENT DOCUMENTS

| CN | 107512316 A | * 12/2017 | |
|---|---|---|---|
| EP | 1712452 A2 | * 10/2006 | ............. B62D 25/04 |

(Continued)

OTHER PUBLICATIONS

Machine language translation of EP 1712452 (Year: 2006).*

*Primary Examiner* — D Glenn Dayoan
*Assistant Examiner* — Kevin P Weldon
(74) *Attorney, Agent, or Firm* — Oblon, McClelland, Maier & Neustadt, L.L.P.

(57) ABSTRACT

A front pillar includes a front-side front pillar and a rear-side front pillar disposed apart from each other in a longitudinal direction of a vehicle. The front-side front pillar is formed in a pipe-like shape in which end faces of a plate member are joined to each other. The front-side front pillar includes a first pillar part having a first circumference, and a third pillar part having a second circumference different from the first circumference.

19 Claims, 10 Drawing Sheets

(56) References Cited

U.S. PATENT DOCUMENTS

| | | | |
|---|---|---|---|
| 2019/0126985 A1* | 5/2019 | Ikeda | B62D 29/007 |
| 2019/0126986 A1* | 5/2019 | Ikeda | B62D 25/04 |
| 2019/0144042 A1* | 5/2019 | Sakabe | B62D 29/043 |
| | | | 296/203.02 |
| 2019/0152419 A1* | 5/2019 | Tanaka | B60R 13/025 |
| 2019/0217790 A1* | 7/2019 | Tanaka | B60S 1/54 |
| 2019/0217899 A1* | 7/2019 | Ikeda | B62D 25/02 |
| 2019/0217900 A1* | 7/2019 | Ikeda | B62D 29/001 |
| 2019/0283100 A1* | 9/2019 | Miss | C21D 1/02 |
| 2020/0130477 A1* | 4/2020 | Kamimura | B62D 27/02 |
| 2020/0148274 A1* | 5/2020 | Ikeda | B60R 13/025 |

FOREIGN PATENT DOCUMENTS

| | | |
|---|---|---|
| JP | H1-125278 U | 8/1989 |
| JP | 2000-102825 A | 4/2000 |
| JP | 2003-276638 A | 10/2003 |
| JP | 2009-019229 A | 1/2009 |
| JP | 2015-151067 A | 8/2015 |
| KR | 101695471 B1 * | 1/2017 |

* cited by examiner

FRONT PILLAR AND MANUFACTURING METHOD THEREFOR

CROSS REFERENCE TO RELATED APPLICATIONS

This application is based upon and claims the benefit of priority from Japanese patent application No. 2018-177569, filed on Sep. 21, 2018, the disclosure of which is incorporated herein in its entirety by reference.

BACKGROUND

The present disclosure relates to a front pillar and a method for manufacturing a front pillar.

Japanese Unexamined Patent Application Publication No. 2003-276638 (hereinafter referred to as Patent Literature 1) discloses a front pillar composed of a front-side front pillar and a rear-side front pillar disposed apart from each other in a longitudinal direction of a vehicle. The front-side front pillar is composed of an integrated tubular member formed by hydroforming. Hydroforming is a molding method in which a fluid such as water is injected into a tubular member, and the tubular member is inflated and pressed against recesses (e.g., dies) by the hydraulic pressure of the fluid. Then, in order to improve a driver's visibility in the forward direction of the vehicle while also ensuring the rigidity of the vehicle, the cross-sectional area of the front-side front pillar is made smaller than the cross-sectional area of the rear-side front pillar.

SUMMARY

The present inventors have found the following problem. In the above-described configuration disclosed in Patent Literature 1, there is room for improvement in regard to the degree of freedom in design.

An object of the present disclosure is to provide a technique for improving the degree of freedom in design of a front-side front pillar while also ensuring the rigidity thereof.

A first exemplary aspect is a front pillar including a front-side front pillar and a rear-side front pillar disposed apart from each other in a longitudinal direction of a vehicle, in which the front-side front pillar is formed in a pipe-like shape in which end faces of a plate member are joined to each other, and the front-side front pillar includes a first pillar part having a first circumference, and a second pillar part having a second circumference different from the first circumference. According to the above-described configuration, it is possible to improve the degree of freedom in design of the front-side front pillar while also ensuring the rigidity thereof.

The first circumference is preferably shorter than the second circumference, and a position of the first pillar part is preferably lower than a position of the second pillar part in a state where the front pillar is attached to the vehicle. According to the above-described configuration, it is possible to improve driver's visibility in the forward direction of the vehicle.

The front-side front pillar preferably supports an end of a windshield in a width direction, and a joint part where the end faces of the plate member are joined to each other preferably faces inward of the vehicle in the longitudinal direction or the width direction of the vehicle in a state where the front pillar is attached to the vehicle. According to the above-described configuration, it is possible to prevent, even when the joint part is significantly deformed at the time of a collision of the vehicle, the windshield from being detached from the front pillar due to this deformation of the joint part.

The front-side front pillar preferably includes a windshield-opposed part that is opposed to the windshield, and a joint part where the end faces of the plate member are joined to each other is preferably located in a part other than the windshield-opposed part. According to the above-described configuration, it is possible to prevent, even when the joint part is significantly deformed at the time of a collision of the vehicle, the windshield from being detached from the front pillar due to this deformation of the joint part.

The second circumference is preferably at least 1.1 times the first circumference. According to the above-described configuration, the degree of freedom in design can be further improved.

The second circumference is preferably at least 1.2 times the first circumference. According to the above-described configuration, the degree of freedom in design can be further improved.

A second exemplary aspect is a method for manufacturing a front pillar including a front-side front pillar and a rear-side front pillar disposed apart from each other in a longitudinal direction of a vehicle, including: forming a different-diameter pipe by joining end faces of a plate member to each other; and performing liquid-sealed molding on the formed different-diameter pipe. According to the above-described method, it is possible to improve the degree of freedom in design of the front-side front pillar while also ensuring the rigidity thereof, and reduce the manufacturing cost.

According to the present disclosure, it is possible to improve the degree of freedom in design of a front-side front pillar while also ensuring the rigidity thereof.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

A front pillar according to an embodiment is described hereinafter with reference to the drawings. Front and rear, right and left, and top and bottom shown in the drawings correspond to front and rear, right and left, and top and bottom, respectively, of a vehicle.

Figure 1:
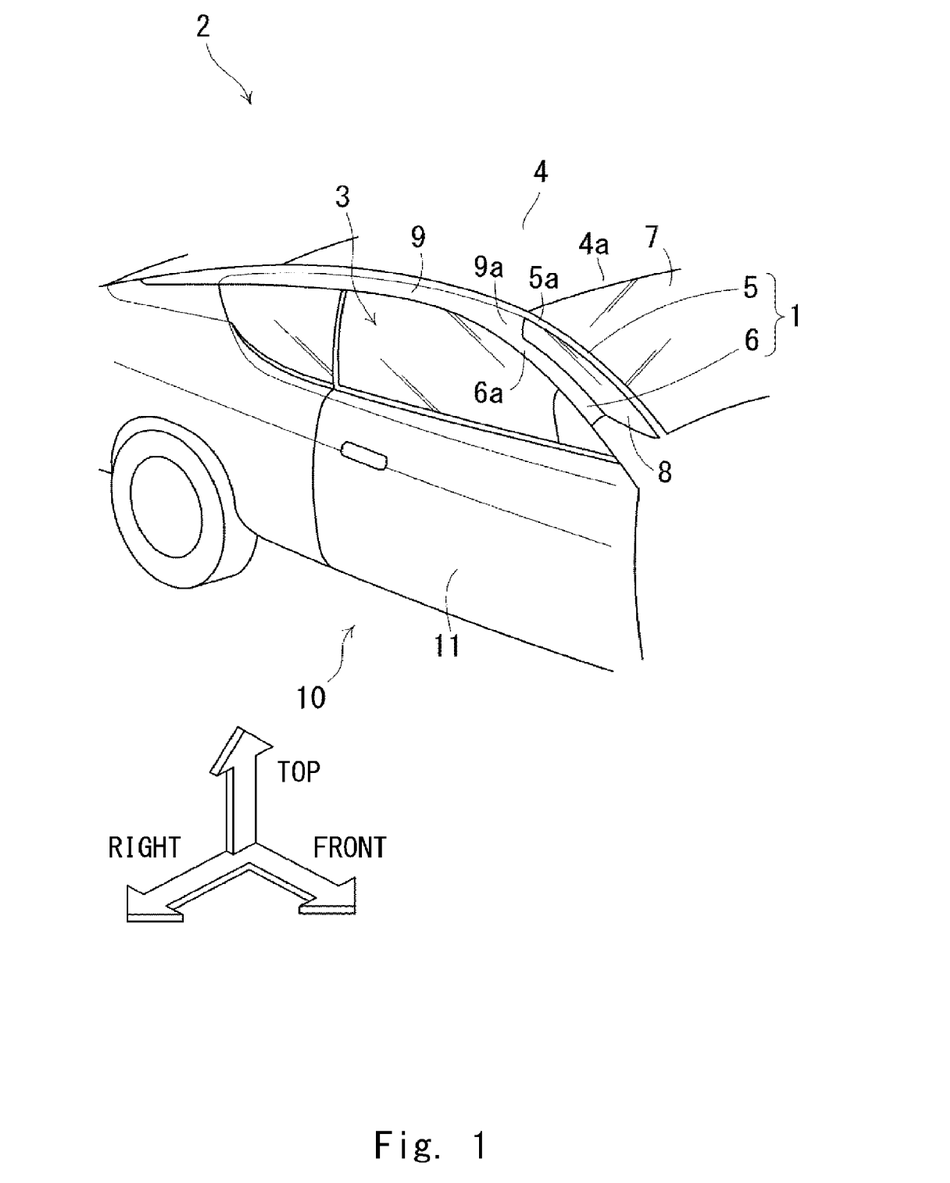
FIG. 1 is a front-right perspective view of a vehicle.

As shown in FIG. 1, a front pillar 1 is disposed in front of a passenger compartment (i.e., an interior space) 3 of a vehicle 2. The front pillar 1 supports a front part 4a of a roof panel 4. The vehicle 2 is constructed in left-right symmetry. Therefore, only the front pillar 1 disposed on the right side of the vehicle 2 is described hereinafter with reference to FIG. 1 and the like, and the description of a front pillar disposed on the left side of the vehicle 2 is omitted.

The front pillar 1 is composed of a front-side front pillar 5 and a rear-side front pillar 6. The longitudinal directions of the front-side front pillar 5 and the rear-side front pillar 6 are roughly parallel to each other. Both the front-side front pillar 5 and the rear-side front pillar 6 extend in the longitudinal direction and the vertical direction of the vehicle 2. The front-side front pillar 5 and the rear-side front pillar 6 extend in an inclined manner so that they extend upward as they extend toward the rear of the vehicle 2. The front-side front pillar 5 and the rear-side front pillar 6 are disposed slightly apart from each other in the longitudinal direction of the vehicle 2. Specifically, the front-side front pillar 5 is disposed on the front side of the vehicle 2 with respect to the rear-side front pillar 6. Further, the front-side front pillar 5 is disposed slightly inward in the vehicle-width direction with respect to the rear-side front pillar 6.

Further, a windshield 7 is disposed between the front-side front pillar 5 of the front pillar 1 disposed on the right side of the vehicle 2 and the front-side front pillar of the front pillar disposed on the left side of the vehicle 2. Further, a sub-window glass 8 is disposed between the front-side front pillar 5 and the rear-side front pillar 6.

Roof side rails 9 (first interposed members) are disposed on the left and right sides of the roof panel 4. The roof side rails 9 extend in the longitudinal direction of the vehicle 2. An upper end 5a of the front-side front pillar 5 and an upper end 6a of the rear-side front pillar 6 are both fixed to a front part 9a of the roof side rail 9 located on the right side of the vehicle 2. In short, the front-side front pillar 5 and the rear-side front pillar 6 are connected through the roof side rail 9. The upper end 5a of the front-side front pillar 5 and the upper end 6a of the rear-side front pillar 6 are not directly connected to each other. However, the upper end 5a of the front-side front pillar 5 and the upper end 6a of the rear-side front pillar 6 may be directly connected to each other.

An opening for a door (hereinafter referred to as an door opening) 10, which is surrounded by the rear-side front pillar 6 of the front pillar 1, the roof side rail 9, and a floor (not shown) of the passenger compartment 3, is formed on the side of the passenger compartment 3 of the vehicle 2. The door opening 10 can be opened and closed by a front door 11.

Next, the front-side front pillar 5 is described in detail with reference to FIGS. 2 to 7.

Figure 2:
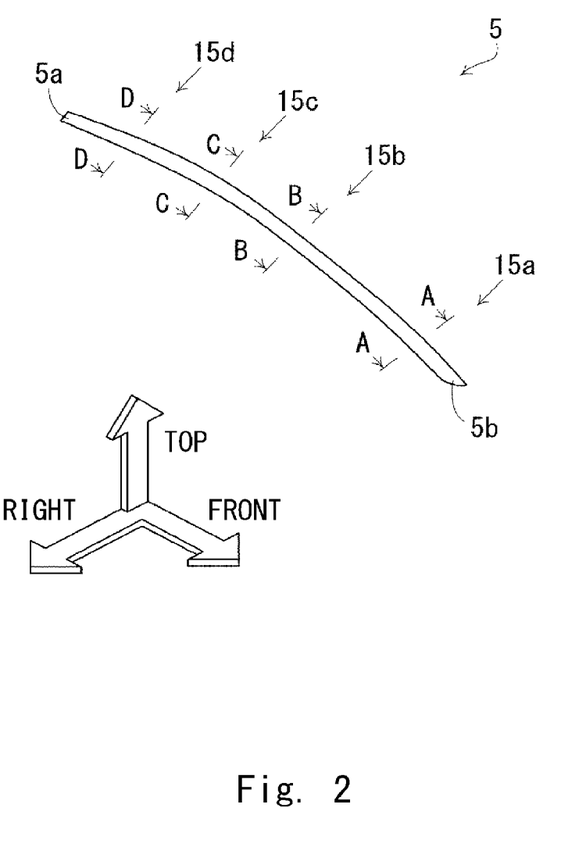
FIG. 2 is a perspective view of a front-side front pillar.

FIG. 2 shows a perspective view of the front-side front pillar 5. The front-side front pillar 5 includes an upper end 5a fixed to the roof side rail 9 and a lower end 5b fixed to a front part of the vehicle 2. In this embodiment, the front-side front pillar 5 is formed by performing liquid-sealed molding on a different-diameter pipe. The front-side front pillar 5 includes, from the lower end 5b toward the upper end 5a, a first pillar part 15a, a second pillar part 15b, a third pillar part 15c, and a fourth pillar part 15d. The first pillar part 15a is disposed below the second pillar part 15b. The second pillar part 15b is disposed below the third pillar part 15c. The third pillar part 15c is disposed below the fourth pillar part 15d.

Figure 3:
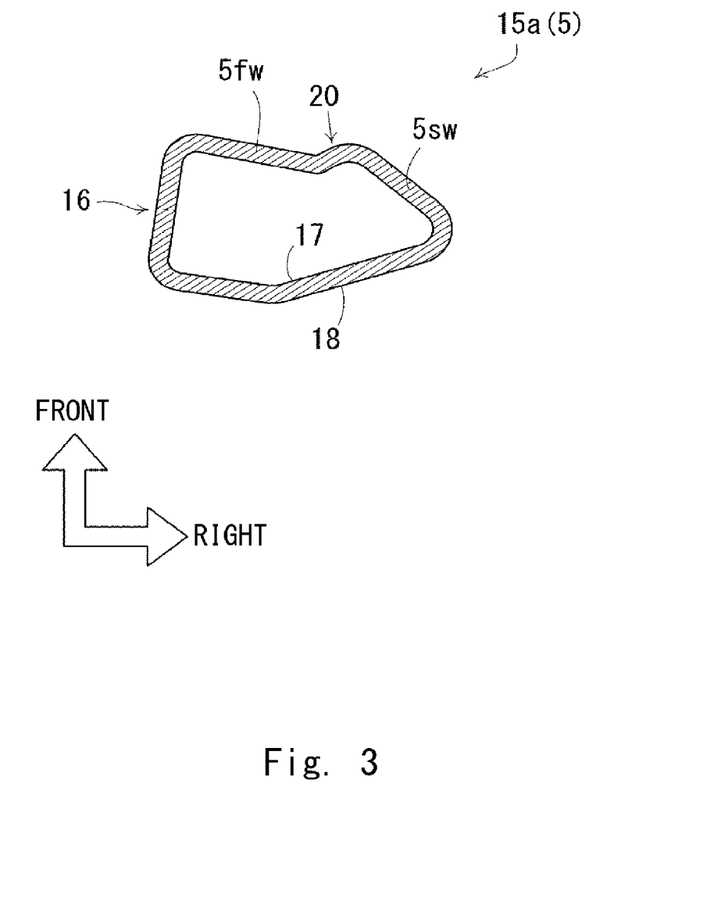
FIG. 3 is an end view taken along a line A-A in FIG. 2.
Figure 4:
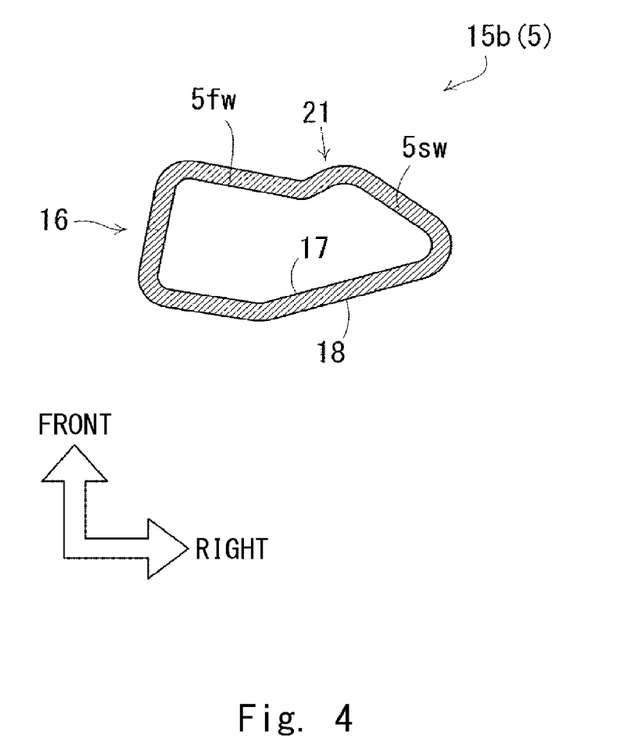
FIG. 4 is an end view taken along a line B-B in FIG. 2.
Figure 5:
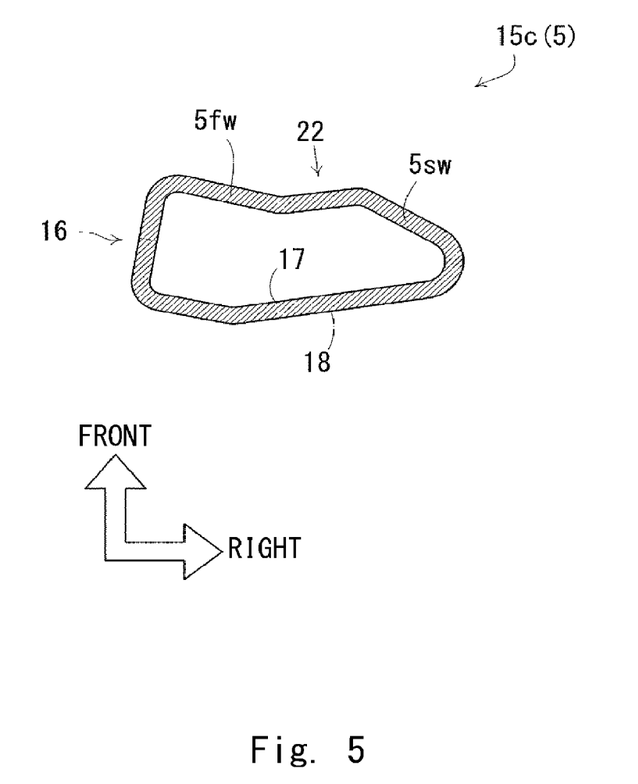
FIG. 5 is an end view taken along a line C-C in FIG. 2.
Figure 6:
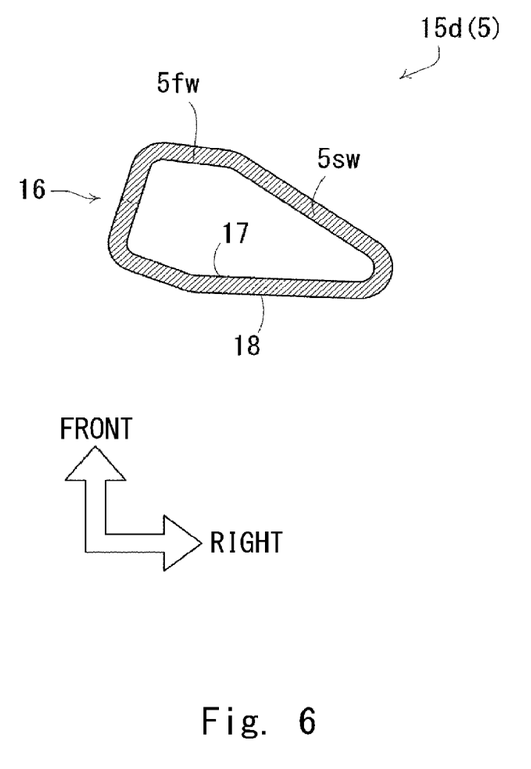
FIG. 6 is an end view taken along a line D-D in FIG. 2.

FIG. 3 shows an end view of the first pillar part 15a. FIG. 4 shows an end view of the second pillar part 15b. FIG. 5 shows an end view of the third pillar part 15c. FIG. 6 shows an end view of the fourth pillar part 15d. Each of these end views is an end view obtained by cutting the front-side front pillar 5 on a plane orthogonal to the longitudinal direction of the front-side front pillar 5.

For example, as shown in FIG. 3, the front part front pillar 5 is formed by joining end faces of a plate member to each other and has a pipe-like shape. In FIG. 3, a joint part 16, which is formed by joining the end faces of the plate member to each other, is indicated by a broken line. As shown in FIG. 3, the cross section of the front pillar 5 has an inner peripheral edge 17 and an outer peripheral edge 18. The inner peripheral edge 17 is a closed curve that defines an inner peripheral side on the cross section of the front-side front pillar 5. The outer peripheral edge 18 is a closed curve that defines an outer peripheral side on the cross section of the front-side front pillar 5. Hereinafter, the term "circumference" means the length of the outer peripheral edge 18 in this specification.

All the numerical values mentioned in the following descriptions are merely examples. In this embodiment, the circumference of the first pillar part 15a (the first pillar part) is 94.9 mm. The circumference of the second pillar part 15b is 101.1 mm. The circumference of the third pillar part 15c (the second pillar part) is 115.8 mm. The circumference of the fourth pillar part 15d is 100.7 mm. As described above, the front-side front pillar 5 is formed as a different-diameter pipe.

The circumference of the first pillar part 15a is shorter than the circumference of the third pillar part 15c. Specifically, the circumference of the third pillar part 15c is at least 1.1 times the circumference of the first pillar part 15a. Further, the circumference of the third pillar part 15c is at least 1.2 times the circumference of the first pillar part 15a. In the example, the circumference of the third pillar part 15c is about 1.22 times the circumference of the first pillar part 15a.

By forming the front-side front pillar 5 as a different-diameter pipe as described above, the degree of freedom in design is increased and the choice of design can be broadened as compared to the straight front-side front pillar (i.e., the front-side front pillar having a constant diameter).

Further, the projected area of the front-side front pillar 5 as viewed from the driver's seat has a positive correlation with the circumference of the front-side front pillar 5. Further, the first pillar part 15a, which has a circumference shorter than that of the third pillar part 15c, is disposed below the third pillar part 15c. Therefore, it is possible to ensure the visibility from the driver's seat toward the front of the vehicle 2. Further, by keeping (i.e., having) a part having a long circumference like the third pillar part 15c on purpose, it is possible to prevent the rigidity of the front-side front pillar 5 from being lowered.

As shown in FIGS. 3 to 7, the front-side front pillar 5 includes a windshield-opposed part 5fw that is opposed to the windshield 7 and is made flat so that the windshield 7 is mounted thereon. Similarly, the front-side front pillar 5 includes a sub-glass-opposed part 5sw that is opposed to the sub-window glass 8 and is made flat so that the sub-window glass 8 is mounted thereon.

As shown in FIG. 3, in the first pillar part 15a, the windshield-opposed part 5fw and the sub-glass-opposed part 5sw are arranged side by side with a step 20 interposed therebetween.

As shown in FIG. 4, in the second pillar part 15b, the windshield-opposed part 5fw and the sub-glass-opposed part 5sw are arranged side by side with a step 21 interposed therebetween.

As shown in FIG. 5, in the third pillar part 15c, the windshield-opposed part 5fw and the sub-glass-opposed part 5sw are arranged side by side with a step 22 interposed therebetween.

As shown in FIG. 6, in the fourth pillar part 15d, the windshield-opposed part 5fw and the sub-glass-opposed part 5sw are arranged side by side without any step interposed therebetween.

Further, as shown in FIGS. 3 to 6, the joint part 16 is located in a part of the front-side front pillar 5 other than the windshield-opposed part 5fw and the sub-glass-opposed part 5sw. In other words, the windshield-opposed part 5fw and the sub-glass-opposed part 5sw are formed in places away from the joint part 16. By forming the joint part 16 in a place away from the windshield-opposed part 5fw and the sub-glass-opposed part 5sw as described above, the following advantageous effects are expected. That is, it is conceivable that when the front-side front pillar 5 is bent or buckled due to a collision of the vehicle 2, rupture occurs along the joint part 16 and the joint part 16 is distorted more widely than other parts are. Assuming that the windshield 7 and the sub-window glass 8 are fixed to the joint part 16, their fixing relations are disrupted due to the above-described deformation, thus raising a possibility that the windshield 7 and/or the sub-window glass 8 are detached from the front-side front pillar 5. In contrast, by forming the joint part 16 in a place away from the windshield-opposed part 5fw and the sub-glass-opposed part 5sw as described above, the fixing relation between the front-side front pillar 5 and the windshield 7 and the fixing relation between the front-side front pillar 5 and the sub-window glass 8 become less likely to be disrupted at the time of a collision of the vehicle 2.

Next, a front-side front pillar structure 30 is described with reference to FIG. 7. The front-side front pillar structure 30 includes the front-side front pillar 5, the windshield 7, the sub-window glass 8, and a front-side front pillar garnish 31. An end 7a of the windshield 7 in the vehicle-width direction (hereinafter referred to as a vehicle-width direction end 7a) is attached to the windshield-opposed part 5fw of the front-side front pillar 5 through a dam rubber 32 and an adhesive 33 interposed therebetween. A front seal 34 for protecting the vehicle-width direction end 7a is provided in the vehicle-width direction end 7a. A forward end 8a of the sub-window glass 8 is attached to the sub-glass-opposed part 5sw of the front-side front pillar 5 through an adhesive 35 interposed therebetween. A rear seal 36 for protecting the forward end 8a is provided in the forward end 8a. The front seal 34 and the rear seal 36 are in tight contact with each other, so that they provide a sealing effect. The front-side front pillar garnish 31 is attached to the front-side front pillar 5 by a clip 37.

Next, a method for manufacturing a front pillar 1 is described with reference to FIG. 8. In this specification, only a method for manufacturing the front-side front pillar 5 of the front pillar 1 is described. Any appropriate manufacturing method may be used for the rear-side front pillar 6.

Firstly, a plate member having widths corresponding to the circumferences of the first to fourth pillar parts 15a to 15d is prepared. In this embodiment, the type of steel of the plate member is high-tensile steel having a tensile strength of 590 MPa or 1.5 GPa. However, the type of material is not limited to this example.

Next, the plate member is bent into a U-shape (S100). Next, the plate member is bent into an O-shape (S110), so that end faces of the plate member are brought close to each other. Next, the end faces of the plate member, which have been brought close to each other, are joined by laser welding (S120). Regarding the joining method, ultrasonic welding may be used instead of the laser welding. As a result, a different-diameter pipe is completed.

Next, after undergoing primary bending (S130) and secondary bending (S140), the different-diameter pipe is shaped into a final shape through liquid-sealed molding (S150). After the liquid-sealed molding, unnecessary parts of the different-diameter pipe are removed as appropriate.

Figure 9:
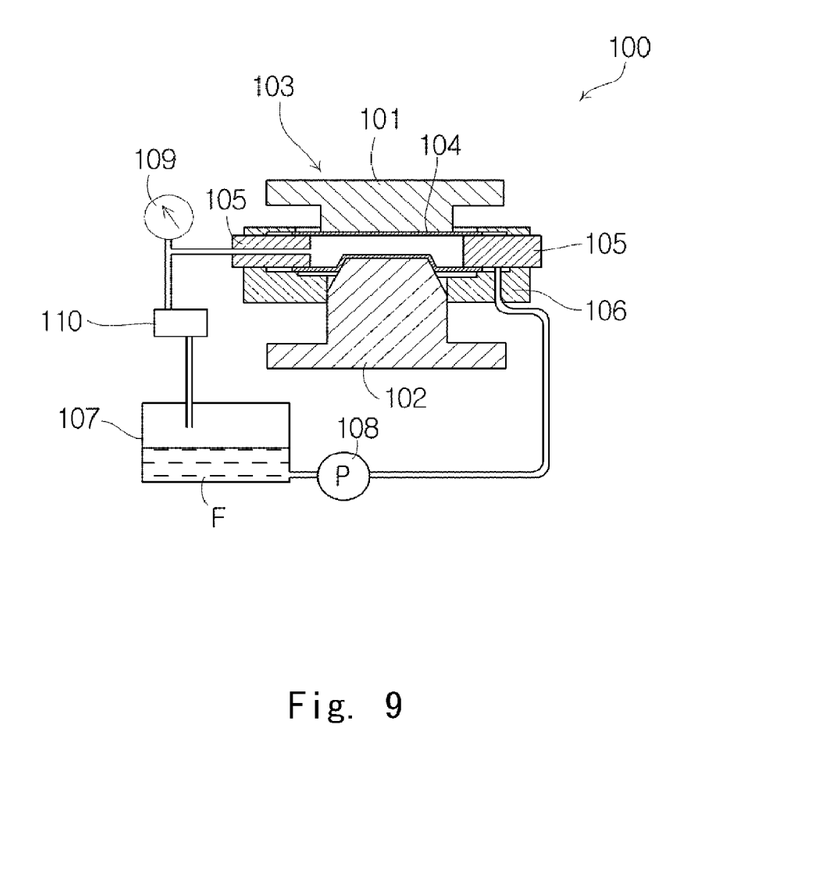
FIG. 9 is a schematic diagram of a liquid-sealed molding apparatus.
Figure 10:
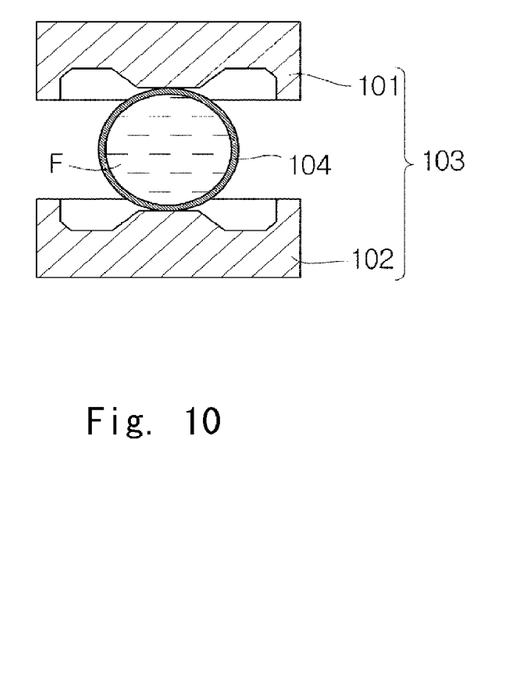
FIG. 10 is an explanatory diagram for liquid-sealed molding.

Next, a liquid-sealed molding apparatus 100 is described with reference to FIGS. 9 to 11. FIG. 9 shows a liquid-sealed molding apparatus 100. The liquid-sealed molding apparatus 100 includes a die 103 composed of an upper die 101 and a lower die 102, a pair of sealing materials 105 for sealing both ends of the different-diameter pipe 104, and a jig 106 for supporting the different-diameter pipe 104 and the pair of sealing materials 105. The liquid-sealed molding apparatus 100 further includes a liquid tank 107 and a pressure-feed pump 108 for pressure-feeding a liquid F contained in the liquid tank 107 into the different-diameter pipe 104. The liquid-sealed molding apparatus 100 further includes a pressure gauge 109 for measuring a pressure of the liquid F inside the different-diameter pipe 104, and a relief valve 110 for discharging the liquid F contained in the different-diameter pipe 104 to the liquid tank 107.

Next, operations of the liquid-sealed molding apparatus 100 are described. Firstly, the different-diameter pipe 104 is set between the upper and lower dies 101 and 102, and both ends of the different-diameter pipe 104 are sealed by the pair of sealing materials 105. Next, the pressure-feed pump 108 is operated, so that the liquid F contained in the liquid tank 107 is pressure-fed into the different-diameter pipe 104. As a result, the inside of the different-diameter pipe 104 is filled with the liquid F as shown in FIG. 10. Note that the liquid F is, for example, water or oil, but is not limited these examples.

Figure 11:
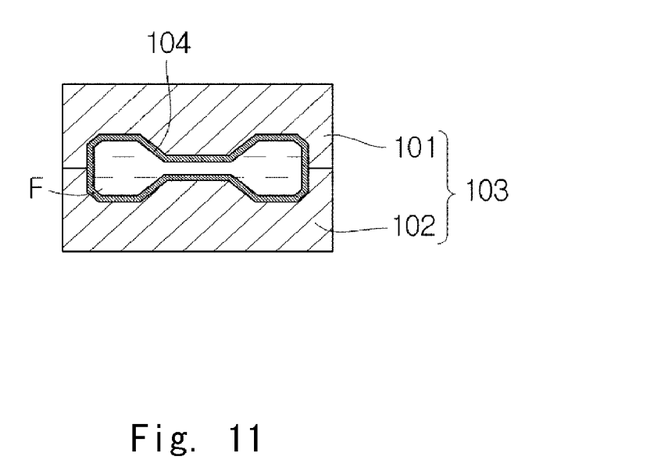
FIG. 11 is an explanatory diagram for liquid-sealed molding.

Next, as shown in FIG. 11, the lower die 102 is raised, so that the different-diameter pipe 104 is compressed between the upper and lower dies 101 and 102. In this process, since the volume of the internal space of the different-diameter pipe 104 is reduced, the internal pressure of the liquid F contained in the different-diameter pipe 104 increases. Then, by the compression by the die 103 and the rise in the internal pressure of the liquid F inside the different-diameter pipe 104, the different-diameter pipe 104 is stretched and compressed at the same time. Therefore, even in the case of steel having a high tensile strength such as high-tensile steel, the different-diameter pipe 104 can be shaped into a desired shape without problems.

Note that it is also conceivable to adopt a method in which a plate member is first shaped into the final shape of a final shaped article and then end faces of the plate member are brought into contact with each other and welded together, so that a different-diameter pipe is formed. However, in this case, the end faces of the plate member are brought into contact with each other after the plate member is shaped into the complicated shape. Therefore, it is expensive to accurately bring the end faces of the plate member into contact with each other. In contrast, in the case of this embodiment, it is possible to reduce the manufacturing cost by first shaping a plate member into a different-diameter pipe and then performing specific molding (e.g., precise molding).

Further, a shaping method called hydroforming has been known. In the hydroforming, a pipe is filled with a liquid and the pipe is shaped into a desired shape by using only the internal pressure of the liquid. However, this hydroforming is a method in which shaping is performed by exclusively relying on the stretching deformation of the pipe. Therefore, it can be used only under limited conditions, such as only when the shape of the final shaped article formed from the pipe is simple. Needless to say, when the shape of the front-side front pillar 5 is simple, the hydroforming may be used, instead of using the liquid-sealed molding, in order to manufacture the front-side front pillar 5.

Preferred embodiments according to the present disclosure have been described above and these embodiments have the following features.

As shown in FIGS. 1 to 6, the front pillar 1 includes the front-side front pillar 5 and the rear-side front pillar 6 disposed apart from each other in the longitudinal direction of the vehicle 2. The front-side front pillar 5 is formed in a pipe-like shape in which end faces of a plate member are joined to each other. The front-side front pillar 5 includes the first pillar part 15*a* (the first pillar part) having a first circumference, and the third pillar part 15*c* (the second pillar part) having a second circumference different from the first circumference. According to the above-described configuration, it is possible to improve the degree of freedom in design of the front-side front pillar 5 while also ensuring the rigidity thereof.

As shown in FIGS. 3 and 5, the circumference (the first circumference) of the first pillar part 15*a* is shorter than the circumference (the third peripheral length) of the third pillar part 15*c*. In a state in which the front pillar 1 is attached to the vehicle 2, the position of the first pillar part 15*a* is lower than the position of the third pillar part 15*c*. According to the above-described configuration, it is possible to improve driver's visibility in the forward direction of the vehicle.

Figure 7:
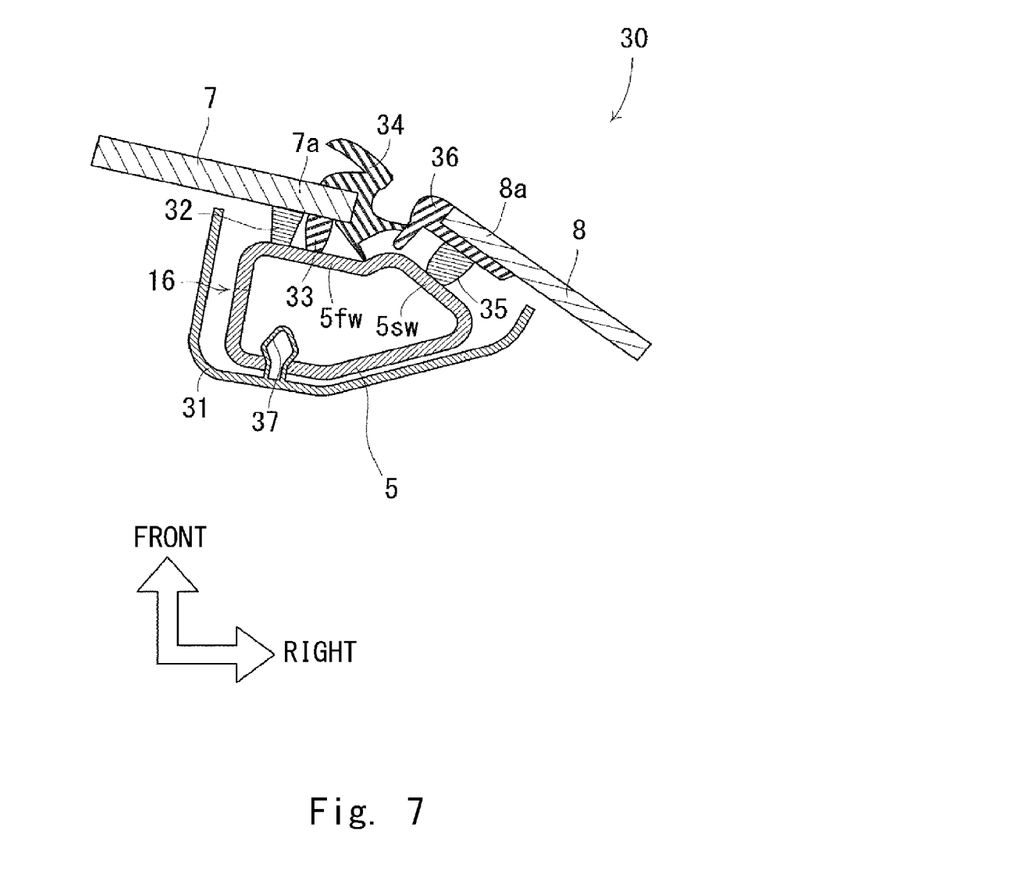
FIG. 7 is an end view showing a state in which a windshield and a sub-window glass are attached to a front-side front pillar.

As shown in FIG. 7, the front-side front pillar 5 supports the vehicle-width direction end 7*a* (i.e., the end in the width direction) of the windshield 7. In a state in which the front pillar 1 is attached to the vehicle 2, the joint part 16 where the end faces of the plate member are joined to each other faces inward of the vehicle 2 (i.e., faces toward the inside of the vehicle 2) in the width direction of the vehicle 2. According to the above-described configuration, it is possible to prevent, even when the joint part 16 is significantly deformed at the time of a collision of the vehicle 2, the windshield 7 from being detached from the front pillar 5 due to this deformation of the joint part 16.

Note that in the state in which the front pillar 1 is attached to the vehicle 2, the joint part 16 where the end faces of the plate member are joined to each other may face inward of the vehicle 2 in the longitudinal direction (i.e., face rearward), instead facing inward of the vehicle 2 in the width direction. Even in this case, it is possible to prevent, even when the joint part 16 is significantly deformed at the time of a collision of the vehicle 2, the windshield 7 from being detached from the front pillar 5 due to this deformation of the joint part 16.

As shown in FIG. 7, the front-side front pillar 5 includes the windshield-opposed part 5*fw* (the windshield-opposed part) that is opposed to the windshield 7. The joint part 16 where the end faces of the plate member are joined to each other is located in a part other than the windshield-opposed part 5*fw*. According to the above-described configuration, it is possible to prevent, even when the joint part 16 is significantly deformed at the time of a collision of the vehicle 2, the windshield 7 from being detached from the front pillar 5 due to this deformation of the joint part 16.

The circumference of the third pillar part 15*c* is at least 1.1 times the circumference of the first pillar part 15*a*. According to the above-described configuration, the degree of freedom in design can be further improved.

The circumference of the third pillar part 15*c* is at least 1.2 times the circumference of the first pillar part 15*a* According to the above-described configuration, the degree of freedom in design can be further improved.

Figure 8:
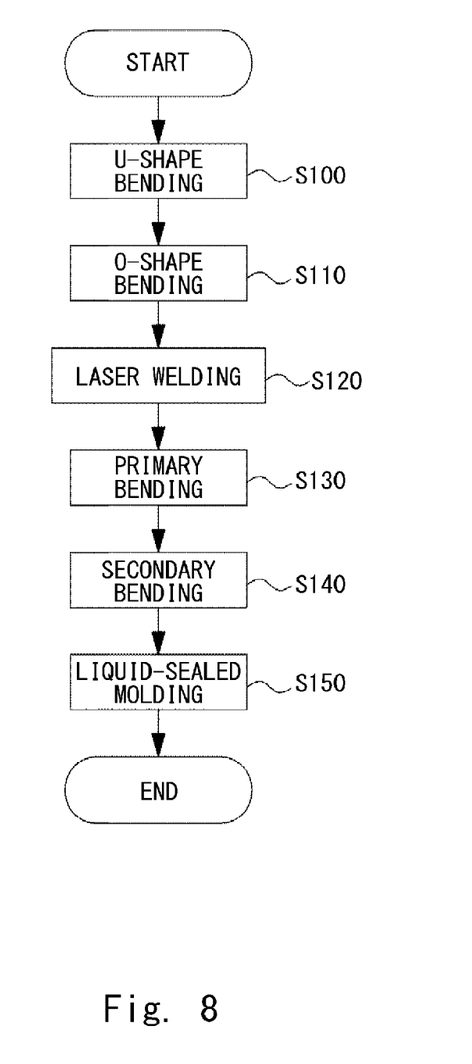
FIG. 8 is a manufacturing flow of a front-side front pillar.

Further, as shown in FIG. 8, the method for manufacturing a front pillar 1 includes a step of forming a different-diameter pipe by joining end faces of a plate member to each other (S100 to S120), and a step of performing liquid-sealed molding on the formed different-diameter pipe (S150). According to the above-described method, it is possible to improve the degree of freedom in design of the front-side front pillar 5 while also ensuring the rigidity thereof, and reduce the manufacturing cost.

The present disclosure is not limited to the above-described embodiments and they can be modified as desired without departing from the scope and spirit of the disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A front pillar comprising:
a front-side front pillar and a rear-side front pillar disposed apart from each other in a longitudinal direction of a vehicle, wherein
the front-side front pillar is formed in a pipe-like shape in which cut faces of a plate member are joined to each other, and
the front-side front pillar includes:
a first pillar part having a first circumference, and
a second pillar part having a second circumference different from the first circumference.

2. The front pillar according to claim 1, wherein
the first circumference is shorter than the second circumference, and
a position of the first pillar part is lower than a position of the second pillar part in a state where the front pillar is attached to the vehicle.

3. The front pillar according to claim 1, wherein
the front-side front pillar supports an end of a windshield in a width direction, and
a joint part where the cut faces of the plate member are joined to each other faces inward of the vehicle in the longitudinal direction or the width direction of the vehicle in a state where the front pillar is attached to the vehicle.

4. The front pillar according to claim 1, wherein
the front-side front pillar comprises a windshield-opposed part that is opposed to a windshield, and
a joint part where the cut faces of the plate member are joined to each other is located in a place other than the windshield-opposed part.

5. The front pillar according to claim 1, wherein the second circumference is at least 1.1 times the first circumference.

6. The front pillar according to claim 1, wherein the second circumference is at least 1.2 times the first circumference.

7. The front pillar according to claim 1, wherein
the first circumference is a first length of an outer peripheral edge of the front-side front pillar, and
the second circumference is a second length of the outer peripheral edge.

8. The front pillar according to claim 7, wherein the outer peripheral edge is a closed curve that defines an outer peripheral side of a cross section of the front-side front pillar.

9. The front pillar according to claim 1, wherein the second circumference is 1.22 times the first circumference.

10. The front pillar according to claim 1, the front-side front pillar includes a third pillar part having a third circumference different from the first circumference and the second circumference.

11. The front pillar according to claim 10, wherein
the first circumference is a first length of an outer peripheral edge of the front-side front pillar,
the second circumference is a second length of the outer peripheral edge, and
the third circumference is a third length of the outer peripheral edge.

12. The front pillar according to claim 11, wherein the outer peripheral edge is a closed curve that defines an outer peripheral side of a cross section of the front-side front pillar.

13. The front pillar according to claim 10, wherein
the first circumference is shorter than the second circumference and the third circumference, and
a position of the first pillar part is lower than positions of the second pillar part and the third pillar part in a state where the front pillar is attached to the vehicle.

14. The front pillar according to claim 12, wherein
the first circumference is shorter than the second circumference and the third circumference, and
a position of the first pillar part is lower than positions of the second pillar part and the third pillar part in a state where the front pillar is attached to the vehicle.

15. The front pillar according to claim 10, the front-side front pillar includes a fourth pillar part having a fourth circumference different from the first circumference, the second circumference, and the third circumference.

16. The front pillar according to claim 15, wherein
the first circumference is a first length of an outer peripheral edge of the front-side front pillar,
the second circumference is a second length of the outer peripheral edge,
the third circumference is a third length of the outer peripheral edge, and
the fourth circumference is a fourth length of the outer peripheral edge.

17. The front pillar according to claim 16, wherein the outer peripheral edge is a closed curve that defines an outer peripheral side of a cross section of the front-side front pillar.

18. The front pillar according to claim 15, wherein
the first circumference is shorter than the second circumference, the third circumference, and the fourth circumference, and
a position of the first pillar part is lower than positions of the second pillar part, the third pillar part, and the fourth pillar part in a state where the front pillar is attached to the vehicle.

19. The front pillar according to claim 17, wherein
the first circumference is shorter than the second circumference, the third circumference, and the fourth circumference, and
a position of the first pillar part is lower than positions of the second pillar part, the third pillar part, and the fourth pillar part in a state where the front pillar is attached to the vehicle.

* * * * *